United States Patent [19]
Ghosh et al.

[11] Patent Number: 5,735,985
[45] Date of Patent: Apr. 7, 1998

[54] METHOD FOR MICROMOLDING CERAMIC STRUCTURES

[75] Inventors: Syamal K. Ghosh, Rochester; Edward P. Furlani, Lancaster; William J. Grande, Pittsford, all of N.Y.

[73] Assignee: Eastman Kodak Company, Rochester, N.Y.

[21] Appl. No.: 749,256

[22] Filed: Nov. 15, 1996

[51] Int. Cl.$^6$ ............ B32B 31/26; C04B 35/622; B29C 33/40

[52] U.S. Cl. .......... 156/89; 156/244.11; 156/245; 156/246; 264/220; 264/226; 264/603; 264/642; 264/670; 264/681

[58] Field of Search .......... 156/89, 242, 244.11, 156/244.22, 244.24, 245, 246; 264/603, 621, 638, 639, 645, 650, 667, 681, 642, 219, 220, 224, 225, 226, 234, 669, 670

[56] References Cited

U.S. PATENT DOCUMENTS

| | | |
|---|---|---|
| 4,717,893 | 1/1988 | Ooi ............ 332/7.51 |
| 4,793,697 | 12/1988 | Wu ............ 350/393 |
| 5,411,690 | 5/1995 | Ghosh et al. ............ 264/63 |

OTHER PUBLICATIONS

Griffith, M.L. et al., "Micromolding of ceramics using photolithographic polyimide patterns," Ceram. Trans., 51 (Ceramic Processing Science and Technology), 321–5, 1995.

Bride, J.A. et al., "Photolithographic micromolding of ceramics using plasma etched polyimide," Appl. Phys. Lett., 63(24), 3379–81, Dec. 1993.

Larry J. Hornbeck, *Digital Light Processing and MEMS: Timely Convergence for a Bright Future*, pp. 3–21, 23–24 Oct. 1996.

Kurt E. Petersen, *Silicon as a Mechanical Material*, pp. 39–73, May 1982.

Edward P. Furlani et al, US Patent Application entitled "*Radiation Reflector*", filed 21 Nov. 1996.

*Primary Examiner*—Curtis Mayes
*Attorney, Agent, or Firm*—Mark G. Bocchetti

[57] ABSTRACT

A method for micromolding ceramic articles and structures having spatial features as small as 0.1 μm and having a depth ranging from 2.0 μm to 100 μm. A master mold of the article or structure to be molded is first fabricated using a silicon wafer and dry etching technology. A negative master mold is then produced by placing the silicon master mold device in a surrounding mold form and filling the surrounding mold form with a silicone or silicone rubber, preferably an RTV™ (a room temperature-vulcanizing silicone rubber compound). Such material replicates each of the micro features of the master mold in great detail to a resolution on the order of 0.1 μm. The negative master mold is then used in a die to mold the desired individual elements or structures from a ceramic powder which is capable of replicating each of the micro features of the negative master mold to the desired resolution. Depending on the resolution required in a particular micromolded element, it may be necessary to use ceramic nano-particles in the micromolding process. For resolution of spatial features having dimensions as small as 0.1 μm and a depth of about 2.0 μm, ceramic nano-particles ranging in size from about 0.01 μm to about 0.02 μm can be used to micromold these features. If an integral structure is to be created from multiple micromolded ceramic elements, the elements are first assembled prior to sintering. Sintering results in an integration of the assembled elements to form a contiguous structure. A single element, or alternatively, multiple elements can be molded simultaneously from the stone mold cavity preferably using a dry pressing process or, in the alternative, a cold isostatic pressing process.

14 Claims, 4 Drawing Sheets

METHOD FOR MICROMOLDING CERAMIC STRUCTURES

BACKGROUND OF THE INVENTION

1. Field of the Invention

The present invention relates generally to methods for molding structures or elements and, more particularly, to a method for micromolding ceramic structures or elements with replicated micro features of high resolution.

2. Brief Description of the Prior Art

A variety of conventional molding techniques are known in the prior art for molding various materials. Such molding techniques include, for example, injection molding of metals, plastics, and ceramics by injecting a measured quantity of the molten material into a die, as well as compression molding of plastics where the plastic material is shaped through heat and pressure. Various pressing methods for molding ceramics are well known in the prior art. These pressing methods include dry pressing, cold isostatic pressing, hot pressing. Hot pressing is typically thought of a simultaneous pressing and sintering operation. In the practice of these pressing methods, ceramic powder is combined with a binder and pressed. The amount of binder used is typically less than about five percent (5%) by weight. In addition, it is known that ceramics can be molded by other molding techniques including extrusion molding, injection molding, gel casting and tape casting. These conventional molding techniques cannot, in and of themselves, be employed to produce micro-sized (5 mm$^3$ or less) elements or structures from ceramics with the required resolution of the desired physical features. Further, these conventional molding techniques do not allow for the capability of merging individually molded ceramic micro components into an integral structure.

SUMMARY OF THE INVENTION

It is, therefore, an object of the present invention to provide a method for micromolding ceramics.

It is a further object of the present invention to provide a micromolding method which replicates micro features with high resolution.

Another object of the present invention is to provide a method for micromolding ceramic which can be used for automated mass fabrication of molded ceramic structures and elements.

Yet another object of the present invention is to provide a method for micromolding individual ceramic elements which can then be integrated with one another to form an integral ceramic structure.

Still another object of the present invention is to provide a method for molding ceramic structures and elements of reduced size on the order of less than five (5) mm$^3$.

Briefly stated, the foregoing and numerous other features, objects and advantages of the present invention will become readily apparent upon reading and review of the detailed description, claims and drawings set forth herein. These features, objects and advantages are accomplished by first fabricating a master mold device using a silicon wafer and dry etching technology. Spatial features with a minimum lateral size of as small as 0.1 μm and having a depth ranging from 0.1 μm to the silicon wafer thickness can be etched on silicon wafers and can be replicated by silicone rubber. A negative master mold is then produced by placing the silicon master mold device in a surrounding mold form and filling the surrounding mold form with a silicone or silicone rubber, preferably an RTV™ (a room temperature-vulcanizing silicone rubber compound). Such material replicates each of the micro features of the master mold device in great detail to a resolution on the order of 0.1 μm. The negative master mold is then used in a die to mold the desired individual elements or structures from a ceramic powder which is capable of replicating each of the micro features of the negative master mold to the desired resolution. Depending on the resolution required in a particular micromolded element, it may be necessary to use ceramic nano-particles in the micromolding process. For resolution of spatial features having dimensions as small as 0.1 μm and a depth of about 2.0 μm, ceramic nano-particles ranging in size from about 0.01 μm to about 0.10 μm can be used to micromold these features. Titanium oxide ($TiO_2$) and calcium titanate ($CaTiO_3$) are examples of commercially available ceramic nano-particles which can be used to micromold spatial features having a depth in the 2.0 μm range. The master mold device duplicates the desired structure for the element or structure to be molded. The resulting micromolded ceramic elements are then sintered. If an integral structure is to be created from multiple micromolded ceramic elements, the elements are first assembled prior to sintering. Sintering results in an integration of the assembled elements to form a contiguous, integral structure. Further, various elements can be produced by different molding processes and, through sintering, can be integrated into a single structure. Thus, various elements molded or micromolded by dry pressing, cold isostatic pressing, tape casting, gel casting, rejection molding, and/or extrusion molding can be integrated into a single contiguous, integral structure through sintering. In addition, a single element, or alternatively, multiple elements can be molded simultaneously from the same mold cavity preferably using a dry pressing process or, in the alternative, a cold isostatic pressing process. In order to simultaneously mold multiple elements, it is necessary to produce an integral master mold device configured to yield a negative master which produces a sheet of integrally formed elements. The sheet of integrally formed elements can then be cut into individual elements.

DETAILED DESCRIPTION OF THE PREFERRED EMBODIMENTS

The micromolding process of the present invention can be employed to produce a variety of elements and structures. Further, micromolding lends itself to mass production of such elements and structures. Thus, for example, the micromolding process of the present invention can be used effectively to produce micro electro mechanical devices such as light reflectors for image projection systems, micro magnets, motors, light modulators, transducers, actuators, and sensors. In addition, the micromolding process can be used to produce micro mechanical components such as gears, screws, bolts, nuts, springs, structural members, etc.

The ceramic selected for use in the practice of the process of the present invention must be fabricated using very fine particles so that during the micromolding process, all of the intricate "micro features" of the particular element or structure being molded are replicated with great precision. The term "micro features" as used herein is intended to mean those spatial features of an element or structure which have at least one dimension in the range of from about 0.1 µm to about 1000 µm. The term "micromolding", and variations thereof, as used herein is intended to mean molding elements or structures which include spatial features having at least one dimension in the range of from about 0.1 µm to about 1000 µm. The average particle size for the ceramic powder should generally be in the range of from about 0.1 µm to about 0.3 µm. The finer the micro features of the particular element or structure being micromolded, the finer the particle size of the ceramic powder should be. Generally, the particle size should be about ten percent (10%) of the smallest dimension of the feature being molded. Thus, for example, if the element to be micromolded includes intricate features ranging in size down to 0.1 µm by 0.1 µm by 2 µm, then ceramic nano-particles ranging in size from about 0.01 µm to about 0.02 µm should be used. The ceramic powder selected for use in micromolding a particular element or structure may also be dependent upon the ultimate use of the particular element or structure. For example, the element or structure may need to be an electrical insulator, or be electrically conductive, or be reflective of light in the visible spectrum, etc. The ceramic powder selected must be capable of delivering the desired characteristic for that particular element or structure.

Figure 1:
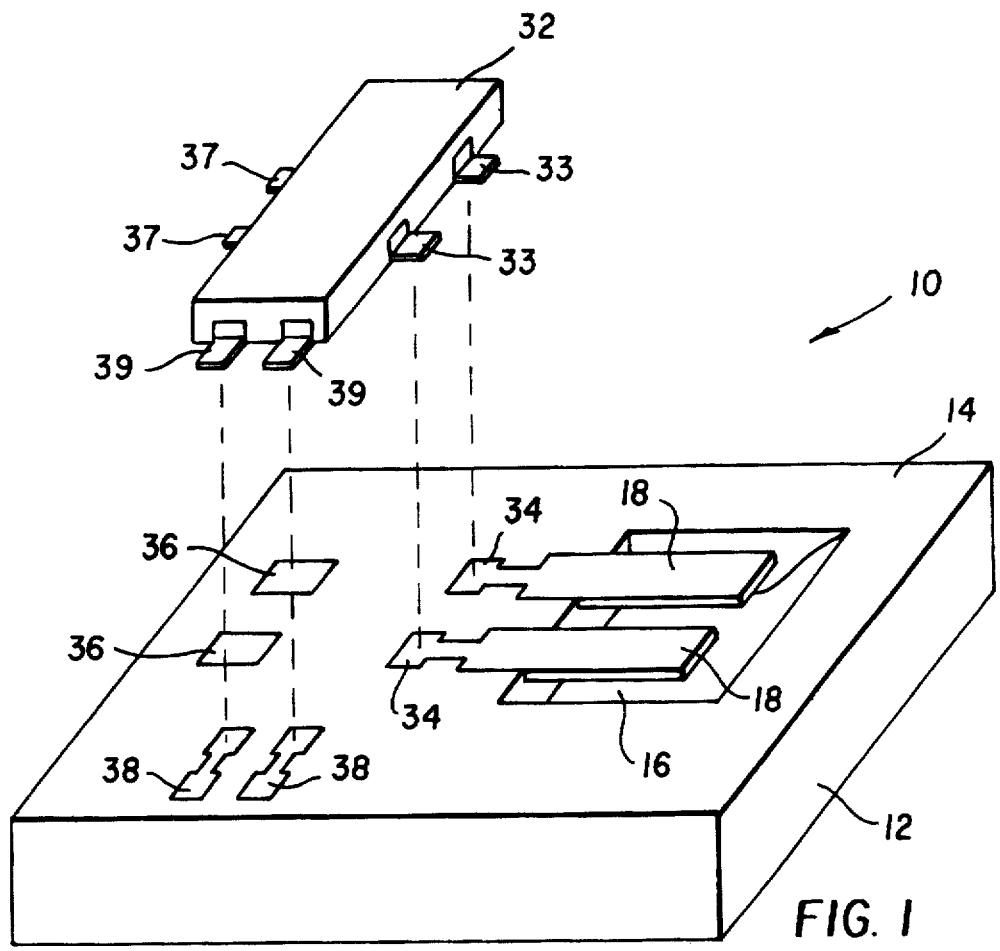
FIG. 1 is a perspective view of an exemplary micromolded integrated ceramic light reflector of the present invention.

In order to provide a full description of the process of the present invention in the appropriate level of detail, it is necessary to discuss the process in terms of an exemplary element to be molded. Thus, the ceramic micromolding process will be discussed hereinafter with regard to micromolding a specific, but merely exemplary light reflector. Turning first to FIG. 1, there is shown a partially exploded perspective view of an exemplary micromolded integrated ceramic light reflector 10. Light reflector 10 is designed for use in an image projection system. The micromolded integrated ceramic light reflector 10 includes a ceramic base element 12 with an upper surface 14 having a cavity 16 molded therein. Extending from one end of cavity 16 is at least one beam 18 (FIG. 1 shows two beams 18). Each beam overhangs cavity 16 in cantilever fashion.

Figure 2:
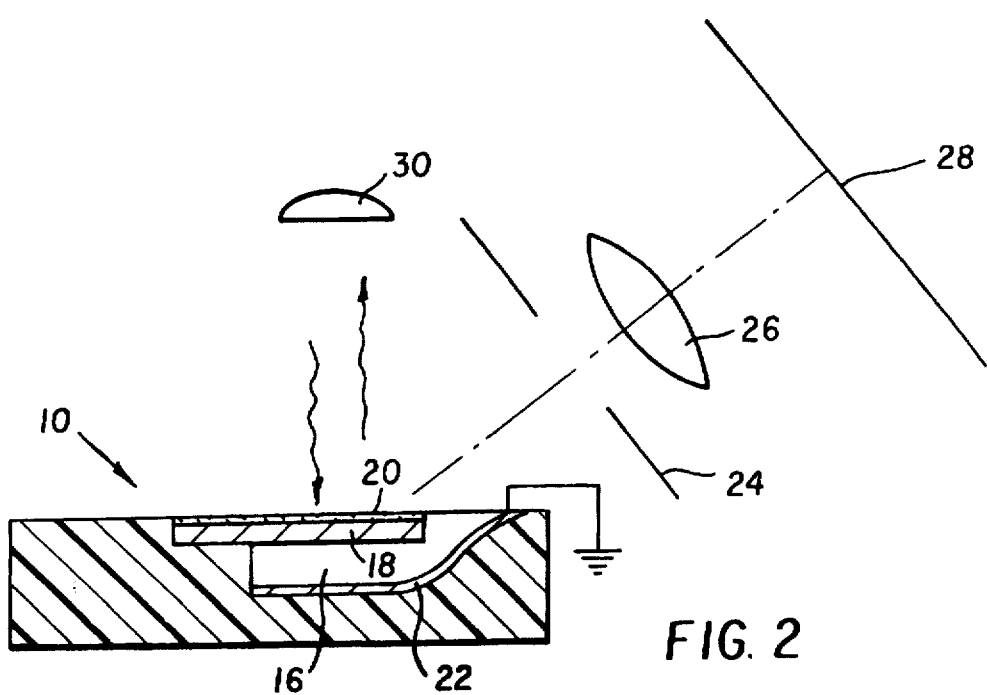
FIG. 2 is a partial section of the exemplary micromolded integrated ceramic light reflector of FIG. 1 shown schematically with image projection optics and a light source with the beam in an undetected position.

Turning to FIG. 2, there is shown the reflector 10 in cross section. The beam 18 overhanging cavity 16 is laminated with an electrically conductive ceramic layer or ribbon 20 which is also a good reflector of the visible radiation spectrum. The base of cavity 16 has a laminate conductor 22 thereon which is also a ceramic. Ribbon 20 is preferably formed by tape casting titanium nitride (TiN). Titanium nitride is both electrically conductive and optically reflective. Other electrically conductive ceramics can be used to create ribbon 20 such as titanium carbide (TiC), titanium boride (TiB$_2$), and boron carbide (B$_4$C). However, such ceramics are not good reflectors of light in the visible spectrum. Therefore, if such other ceramics are used for ribbon 20, it will be necessary to ribbon 20 with an optically reflective overlay such as gold, silver, or aluminum.

Laminate conductor 22 is also preferably formed by a tape casting process from an electrically conductive ceramic material. Because laminate conductor 22 does not have to be reflective of light in the visible spectrum, the ceramic used for generating laminate conductor 22 can be titanium carbide (TIC), titanium boride (TiB$_2$), boron carbide (B$_4$C), or other known electrically conductive ceramics. Ceramic ribbon 20 and laminate conductor 22 are both sintered in place at their respective locations on the reflector 10 as will be described more fully hereinafter.

Figure 3:
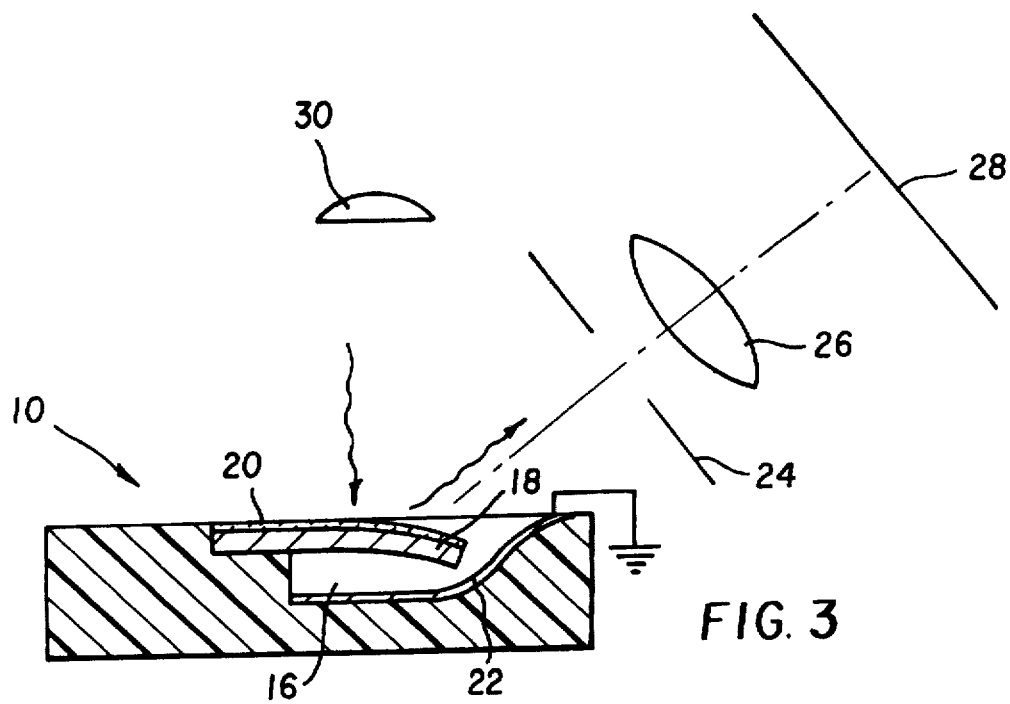
FIG. 3 is a partial section of the exemplary micromolded integrated ceramic light reflector of FIG. 1 shown schematically with image projection optics and a light source with the beam in a deflected position.

Referring to FIG. 3, the reflector 10 of FIG. 2 is shown in relationship to a light stop 24, lens 26 and display screen 28 depicted schematically. Light incident to ceramic ribbon 20 from light source 30 is perpendicular to the surface of beam 18 and, therefore, to ceramic ribbon 20 when beam 18 is in an undetected position. Note that when beam 18 is in this undetected position, no reflected light passes through the light stop 24 and through the lens 26 onto the display screen 28. When a potential is applied to ribbon 20 which serves as the activation electrode, ribbon 20 experiences an electrostatic attractive force to laminate conductor 22 at the base of cavity 16 which serves as the grounded electrode. This electrostatic attractive force causes beam 18 to deflect downwardly into cavity 16 as shown in FIG. 3. Note that when beam 18 is in the deflected position light from light source 30 incident on reflective ceramic ribbon 20 on the surface of beam 18 reflects at an angle such that the reflected light passes through light stop 24 and lens 26 and onto display screen 28. Thus, equating the micromolded reflector 10 of the present invention to a pixel, the reflector 10 of the present invention can be used to control the light output to a given surface for a single pixel. In such manner, the reflector 10 can be readily adapted for use with digital displays and printing applications.

A drive and control electronics package 32 (see FIG. 1) is affixed to the surface 14 of the base element 12. Terminals 33 extending from drive and control electronics package 32 are connected to a pair of conductor traces 34 on the surface of base element 12 by soldering. The pair of conductor traces 34 connect the drive and control electronics package 32 to ribbons 20 on beams 18. Also traced on the surface of base element 12 are conductors 36, 38. Conductors 36, 38 are solder connected to control input terminals 37 and power input terminals 39, respectively, projecting from drive and control electronics package 32.

Those skilled in the art will recognize that the reflective as well as electrically conductive ribbon 20 will deflect with cantilevered beam 18. As such, if ribbon 20 was merely adhered to the surface of beam 18, the frequent deflection of beam 18 and ribbon 20 would stress ribbon 20 which could result in failure of ribbon 20 or delamination of ribbon 20 from the surface of beam 18. The potential for this type of failure is obviated by sintering ribbon 20 in place on the surface of beam 18 resulting in ribbon 20 becoming integrally connected to beam 18.

Figure 4:
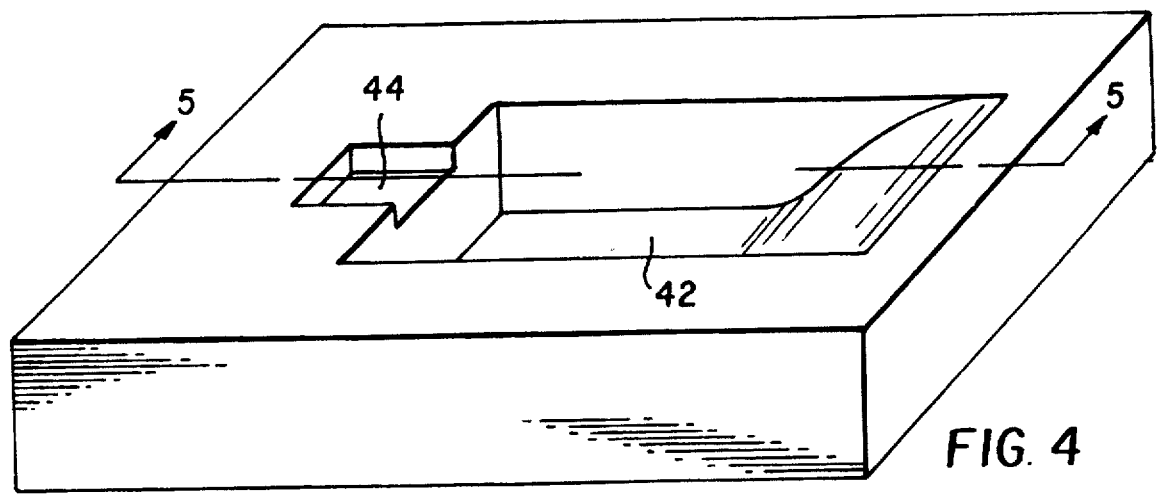
FIG. 4 is a perspective view of an exemplary micromolded ceramic light reflector base element.
Figure 5:
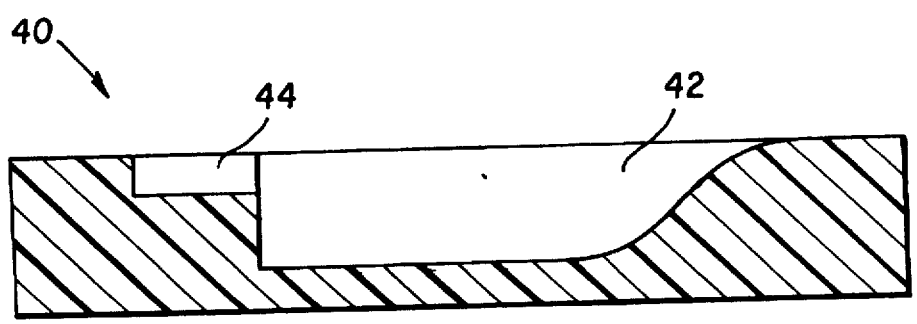
FIG. 5 is a sectional view of the micromolded ceramic light reflector base element taken along line 5—5 of FIG. 4.
Figure 6:
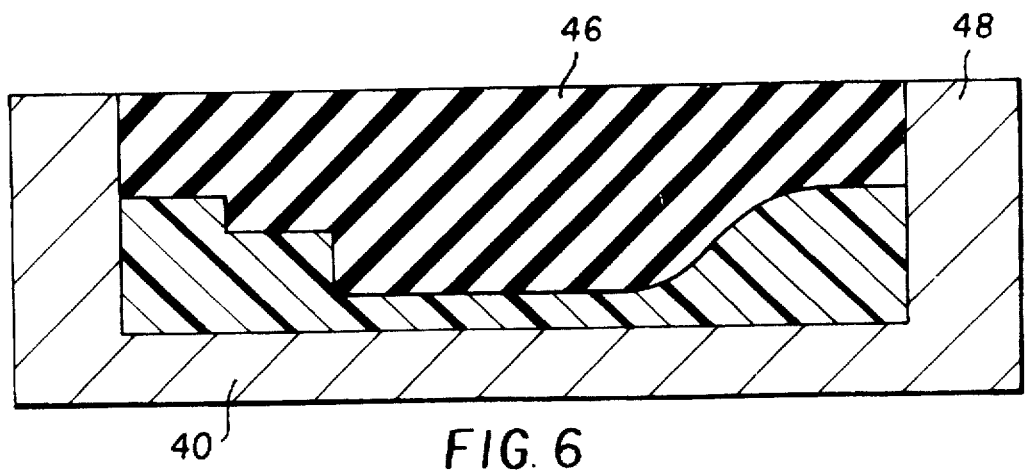
FIG. 6 is sectional view a molding apparatus used for generating a negative master.
Figure 7:
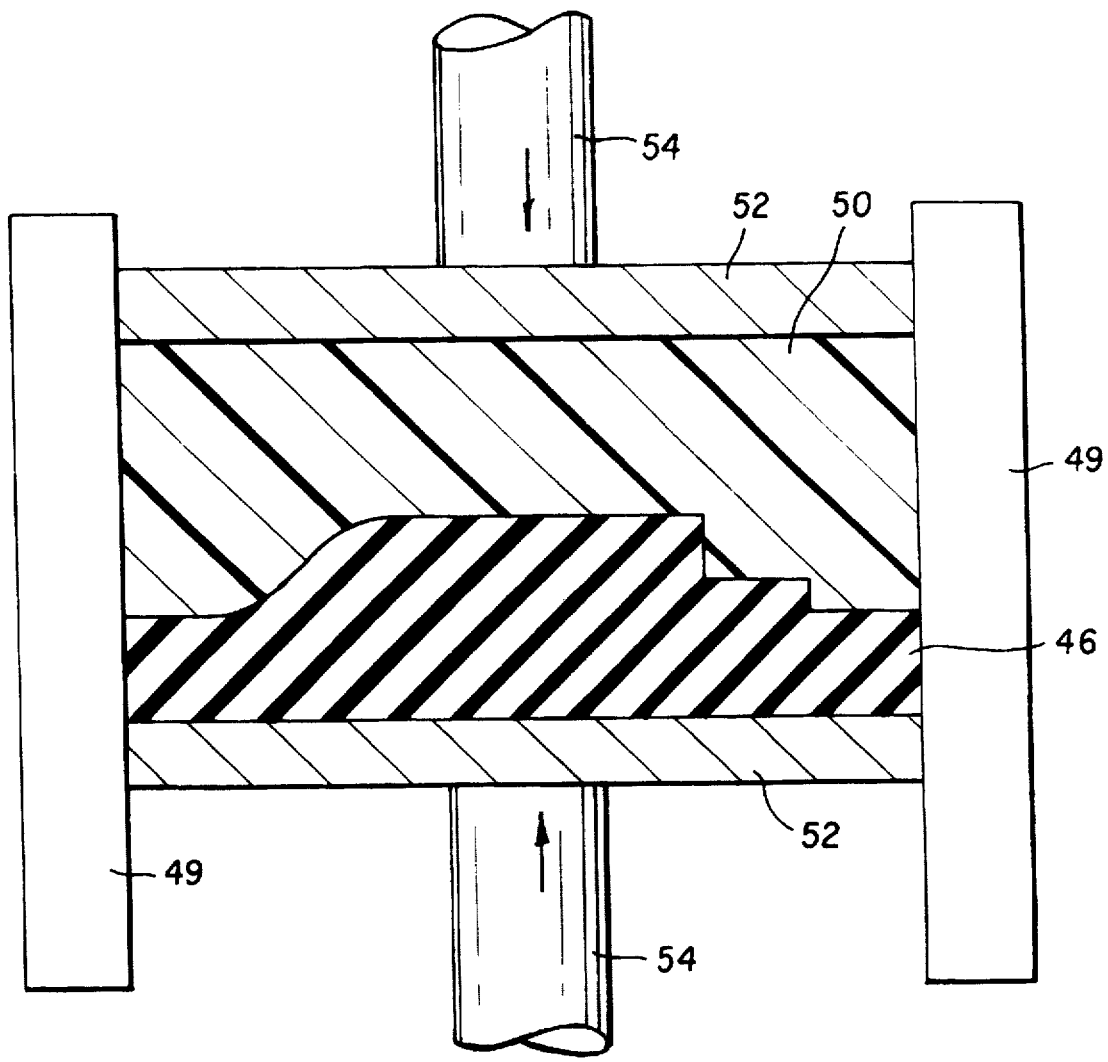
FIG. 7 is a sectional schematic of an apparatus for producing a micromolded ceramic light reflector base element using the negative master.

In order to micromold a ceramic light reflector 10, it is first necessary to fabricate a master mold device 40 (see FIGS. 4 and 5) using a silicon wafer and dry etching technology. Silicon wafer and dry etching technology allows the master mold device 40 to be produced with the desired resolution of structural features (ranging in size down to about 0.1 μm by 0.1 μm by 2.0 μm) for base element 12. Thus, master mold device 40 includes a cavity 42 (having approximate dimensions of 1 mm by 1 mm by 0.1 mm in depth) in the top surface thereof and a smaller recess 44 which is contiguous with cavity 42. A negative master 46 (see FIG. 6) is then produced by placing the silicon master 40 in a surrounding mold form 48. A silicone or silicone rubber, for example dimethylsiloxane or an RTV™ (a room temperature-vulcanizing silicone rubber compound), is used as the material from which the negative master 46 is produced. Such material replicates the micro features of master mold device 40 in great detail (down to 0.1 μm by 0.1 μm by 2 μm in size). The negative master 46 is then mounted in a metal die 49 (see FIG. 7) which is used to fabricate the base element 12 of the light reflector 10 of the present invention. The fine particulates of the chosen ceramic powder are then mixed with an organic binder in a spray dryer and poured into die 49 containing the negative master 46 made from, for example, an RTV™. The mixture of ceramic powder and organic binders is then pressed uniaxially at a pressure of preferably about 10,000 psi and not exceeding 15,000 psi by means of compression plates 52 mounted to rod members 54 to yield a green base element 50. A single base element 12, or alternatively, multiple base elements 12 can be molded simultaneously from the same mold cavity preferably using a dry pressing process or, in the alternative, a cold isostatic pressing process. Of course, in order to simultaneously mold multiple base elements 12, it will be necessary to produce an integral master mold device configured to yield a negative master which produces a sheet of integrally formed base elements 12. The sheet of integrally formed base elements 12 can then be cut into individual base elements 12.

The ceramic selected for micromolding the light reflector 10 must be fabricated using very fine particles so that during the micromolding process, all of the intricate features of the reflector 10 are replicated with great precision. The powder employed in the process of the present invention for forming a base element 12 of the reflector 10 in its precompacted, presintered form preferably comprises zirconium oxide alloyed with one or more secondary oxide powders selected from the group consisting of yttria, ceria, calcia and/or magnesia. The powder should have certain properties in order to produce a ceramic of the invention consisting essentially of tetragonal phase, cubic and monoclinic phase-free, crystal grain structure. Particle size and distribution of the powder should be uniform, having an agglomerate size in the range of from about 30 μm to about 60 μm with an average of about 50 μm. "Agglomerate" can be defined as an aggregate of individual particles of the ceramic powder, and each particle may comprise multiple grains. "Grain" can be defined as crystals, within the particle, having a spatial orientation that is unaligned with or distinct from adjacent grains. The grain size should be in the range of from about 0.1 μm to about 6 μm, with a preferred size of about 0.3 μm. The term "net shape" as used herein, e.g. as in net shape ceramic or net shape part, means that the ceramic is dimensionally true after sintering and therefore should not necessitate further machining prior to use in its intended working environment. In other words, the dimensions both of the green part and the ceramic are predictable in that the amount of shrinkage of the green part during sintering is predictable, producing a ceramic part that conforms to a predetermined shape and dimensions. The amount of shrinkage along any axis of the compacted powder form to that of the net shape ceramic should be less than about 0.001 percent in order to obtain close, predictable dimensional tolerances and produce the net shape ceramic of the invention. Such a part can then be put in its intended use without having to carry out a machining operation. Purity of the material should also be well controlled in the range of from about 99.9 percent to 99.99 percent by weight; that is, impurities should be present in the amount of no more than about 0.1 to about 0.01 percent by weight.

The moisture content of the powder should be maintained between about 0.2 to about 1.0 percent by volume of the powder when compacted. Too dry a powder can result in too porous a ceramic, and too high a moisture level can inhibit good release of the green parts from the mold surface. A preferred moisture content is about 0.5 percent.

The powder is compacted into a green part by means of a die press or the like. The term "green part" as used herein means the powder in its compacted, presintered state. The powder should be compacted by applying uniform compacting forces to the powder in order to produce a green part having a uniform density. A preferred compacting device that achieves uniform compacting forces is a floating mold die press. The green part should have a predetermined density selected by the operator to produce, after sintering, a net shape ceramic article. For example, for specific compositions of powder (zirconia alloyed with yttria, ceria, calcia and/or magnesia) described herein, a preferred green part density is in the range of from about 3.0 g/cc to about 3.5 g/cc. The compaction pressure determines the density of the green part and consequently that of the ceramic. If the compaction pressure is too low, the ceramic can have a lower than desired density and not attain the desired net shape. If the compaction pressure is too high, the green part can delaminate and result in a ceramic that is defective for the intended use, e.g., for cutting. The compaction pressure for the above-mentioned alloyed zirconia powders should be in the range of from about 10,000 psi to about 15,000 psi, and a preferred compaction pressure is about 12,000 psi.

The compaction time can be readily determined by the operator depending on the compaction pressure selected. Compaction time, for example, can be in the range of from about 60 seconds to 10 seconds for compaction pressures in the range of from about 10,000 psi to about 15,000 psi, respectively, and about 30 seconds for a compaction pressure of about 12,000 psi. To produce a net shape ceramic according to the invention, the compacting is carried out for a time sufficient to compact the powder to form a green part having a predetermined density for the selected powder, e.g., from about 3.0 g/cc to about 3.5 g/cc as above described. It is well known that the compaction pressure and time selected by the operator can be dependent on the size of the finished part. Generally, as the part size increases, compaction pressure and/or compaction time increase.

The powder is compacted in the presence of an organic water-soluble binder, such as polyvinyl alcohol, gelatin, or a polyester ionomer. The binder can be added to and mixed with the powder, for example, by spray drying or ball milling, prior to placing the powder in the compacting device.

In order to micromold the light reflector 10, zirconia particles with an average particle size of 0.3 μm are used. This particle size allows for the replication through micromolding of features as small as 3 μm by 3 μm. In such manner, the structure of the silicon master mold device 40 can thereby be substantially duplicated to the degree of resolution needed for production of light reflectors for use in image projection systems. The degree of resolution required will, of course, vary with the particular element or article being micro molded. For example, if, as opposed to molding a light reflector 10, the article to be molded was a micro gear having micro features on the order of 2 μm with dimensional tolerances of 0.1 μm, then the ceramic selected would likely be $TiO_2$ which allows for an average particle size of 0.02 μm.

The base element 12 of the ceramic light reflector 10 can be made from fine particles of zirconia (0.1 to 0.3 microns) alloyed with one or more secondary oxide powders such as, for example, yttria, ceria, calcia and/or magnesia. If yttria or calcia is selected, the range of mole percent thereof is from about 0.5 to 5.0. For magnesia, the range of mole percent thereof is from about 0.1 to about 1.0. The secondary oxides can be mixed either mechanically or, preferably, chemically by a coprecipitation process. The alloyed powder is then ball milled and spray dried with 2% to 5% by weight of an organic binder such as polyvinyl alcohol.

Figure 8:
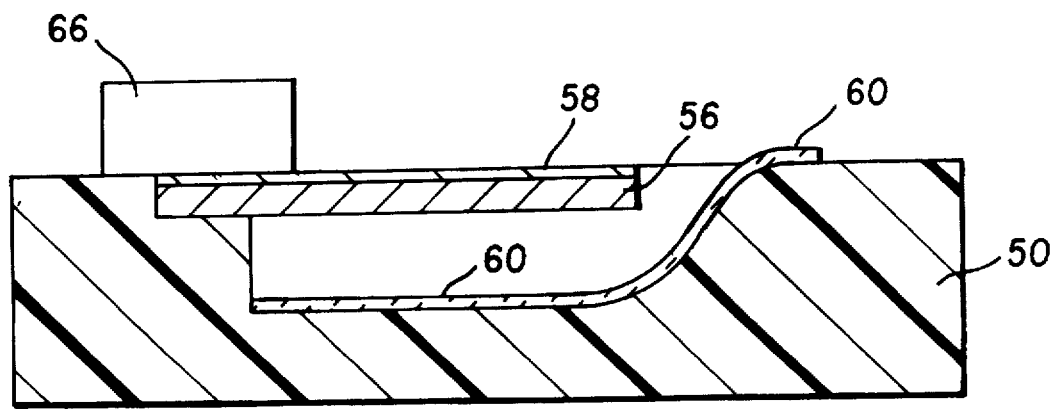
FIG. 8 is a sectional view of a green base element and green beam prepared for sintering.

As can be seen, the green base elements 50 are initially molded without the beams 18 in place. Separately molded green beams 56 are placed on the green base elements 50 prior to sintering as depicted in FIG. 8. Green beams 56 are molded separately via a dry pressing process or a tape casting process using the same alloyed ceramic zirconia powder used to fabricate the green base element 50. As with the green base element 50, one or more green beams 56 can be fabricated in a single cavity mold and then cut or sliced into single green beams 56 in the green stage. Once again, if yttria or calcia is selected, the range of mole percent thereof is from about 0.5 to 5.0. For magnesia, the range of mole percent thereof is from about 0.1 to about 1.0. The secondary oxides can be mixed either mechanically or, preferably, chemically by a coprecipitation process. It is important to alloy the ceramic powders in these ratios in order produce a tetragonal zirconia polycrystal structure. A tetragonal zirconia polycrystal structure (after sintering) allows beam 18 to exhibit the characteristics of good bending capability with resistance to fracture or fatigue failure. These characteristics are necessary given that each beam 18 may be called upon to cycle between an undetected position and a deflected position millions of times during its life.

The green beam 56 is placed on the micromolded green base element 50 with one end of green beam 56 inserted into recess 44. A green ribbon or laminate 58 and a green laminate conductor 60, preferably made by tape casting an electrically conductive ceramic onto a Mylar® support web, are placed on green beam 56 and on the bottom surface of cavity 62, respectively, as shown in FIG. 8. The ceramic used in the tape casting process to produce green ribbon 58 and green laminate conductor 60 must be an electrically conductive ceramic material. In addition, ceramic used in the tape casting process to produce green ribbon 58 (which ultimately becomes ribbon 20 after sintering) must also have high reflectivity with respect to visible light. Green ribbon 58 is preferably formed by tape casting titanium nitride (TiN). Titanium nitride is both electrically conductive and optically reflective. Other electrically conductive ceramics can be used to create green ribbon 58 such as titanium carbide (TiC), titanium boride ($TiB_2$), and boron carbide ($B_4C$). However, such ceramics are not good reflectors of light in the visible spectrum. Therefore, if such other ceramics are used for ribbon 20, it will be necessary to provide ribbon 20 with an optically reflective overlay or coating after sintering. Providing a coating or overlay (which can be broadly included as falling within the term "laminate") of gold or silver after sintering green will yield a workable, optically reflective surface to ribbon 20. Green laminate conductor 60 is also preferably formed by a tape casting process from an electrically conductive ceramic material. Because green laminate conductor 60 (which ultimately becomes laminate conductor 22 after sintering) preferably does not have high reflectivity of light in the visible spectrum, the ceramic used for generating green laminate conductor 60 can be one of a variety of known electrically conductive ceramics. Those electrically conductive ceramics include, for example, carbides such as titanium carbide (TiC), boron carbide ($B_4C$), and tungsten carbide (WC), borides such as titanium boride ($TiB_2$) and zirconium boride ($ZrB_2$), and silicides such as molybdenum silicide ($MoSi_2$) and niobium silicide ($Nb_2Si_5$), as well as other known electrically conductive ceramics.

Figure 9:
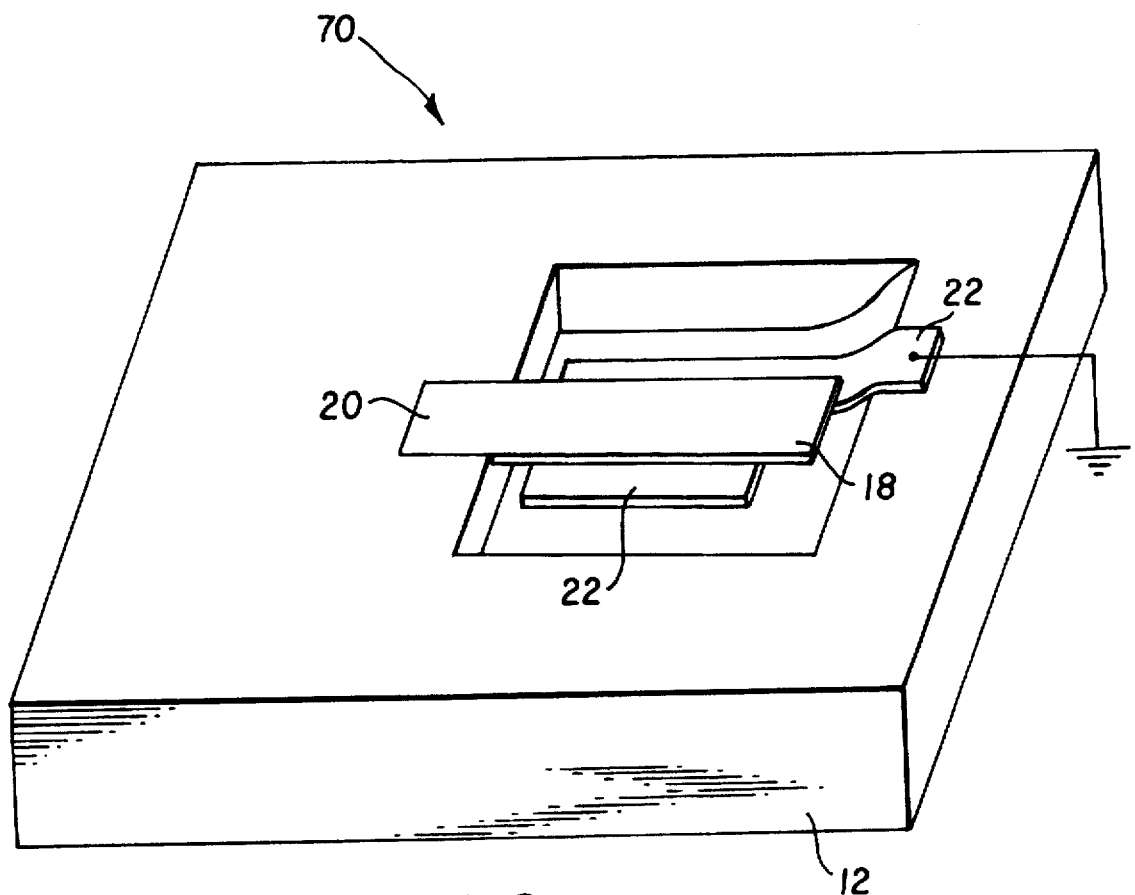
FIG. 9 is a perspective view of an exemplary micromolded sintered reflector body of the present invention.

Green beam 56 and green ribbon 58 should be fixtured such that movement of green beam 56 and green ribbon 58 relative to green base element 50 does not occur during the sintering process. Fixturing can be accomplished by using a weight 66 over that end of green beam 56 and green ribbon 58 residing in recess 44 (see FIG. 8). Weight 66 can be made from a piece of sintered oxide ceramic such as alumina, magnesia, or zirconia. The green base element 50, green beam 56, green ribbon 58, and green laminate conductor 60 are then sintered in air at 1500° C. for two hours to form the basic micromolded sintered reflector body 70 of the device 10 of the present invention, an example of which is depicted in FIG. 9. The basic micromolded sintered reflector body 70 includes base element 12, beam 18, reflective mad conductive ribbon 20, and electrically conductive laminate 22 which as a result of sintering are integrally connected. The preferred sintering schedule for sintering the green base element 50 and the green beam 56 is to sinter such green parts by sequentially:

(a) heating the green parts from about room temperature to about 300° C. at a rate of about 0.3° C./min.;
(b) heating the green parts from about 300° C. to about 400° C. at a rate of about 0.1° C./min.;
(c) heating the green parts from about 400° C. to about 600° C. at a rate of about 0.4° C./min.;
(d) heating the green parts from about 600° C. to about 1500° C. at a rate of about 1.5° C./min.;
(e) maintaining the green parts at about 1500° C. for about 120 minutes to form a sintered reflector body;
(f) cooling the sintered reflector body from about 1500° C. to about 800° C. at a rate of about 2° C./min.;
(g) cooling the sintered reflector body from about 800° C. to about room temperature at a rate of about 1.6° C./min. to form a ceramic micromolded reflector body.

Such sintering schedule is disclosed in U.S. Pat. No. 5,411,690 to Ghosh et al which is hereby incorporated by reference herein. This sintering schedule is specific to the example of alloying zirconium oxide with one or more secondary oxides as stated above. The sintering schedules for other ceramic materials or mixtures thereof will vary.

From the foregoing, it will be seen that this invention is one well adapted to attain all of the ends and objects hereinabove set forth together with other advantages which are apparent and which are inherent to the invention.

It will be understood that certain features and subcombinations are of utility and may be employed with reference to other features and subcombinations. This is contemplated by and is within the scope of the claims.

As many possible embodiments may be made of the invention without departing from the scope thereof, it is to be understood that all matter herein set forth and shown in the accompanying drawings is to be interpreted as illustrative and not in a limiting sense.

What is claimed is:

1. A method for micromolding a ceramic element comprising the steps of:
   (a) etching a silicon wafer to generate a master mold which includes micro features ranging in size from about 0.1 μm to about 1,000 μm;
   (b) forming a negative master mold from a micro feature replicating material using the master mold;
   (c) mounting the negative master mold in a die;
   (d) placing a ceramic powder having an average particle size ranging in size from about 0.01 μm to about 0.3 μm in the die;
   (e) compression molding the ceramic powder to form a green base element;
   (f) sintering the green base element.

2. A method for micromolding a ceramic article comprising the steps of:
   (a) etching a silicon wafer to generate a master mold which includes micro features ranging in size from about 0.1 μm to about 1,000 μm;
   (b) forming a negative master mold from a micro feature replicating material using the master mold;
   (c) mounting the negative master mold in a die;
   (d) placing a ceramic powder having an average particle size ranging in size from about 0.01 μm to about 0.3 μm in the die;
   (e) compression molding the ceramic powder to form a first green element;
   (f) forming a second green element from the ceramic powder;
   (g) supporting the first green element and the second green element in a predetermined, contacting relationship; and
   (h) sintering the first and second green elements while residing in the predetermined, contacting relationship.

3. A method as recited in claim 2 further comprising the steps of:
   (a) forming a third green element from a ceramic powder; and
   (b) supporting the third green element with the first green element and the second green element prior to said sintering step.

4. A method as recited in claim 2 wherein:
   the ceramic powder is zirconia alloyed with at least one secondary oxide powder selected from the group consisting of yttria, ceria, calcia and magnesia.

5. A method as recited in claim 2 wherein:
   the ceramic powder used in said compression molding step and said forming step for forming the second green element is zirconia alloyed with magnesia present in the range of from about 0.1 to 1.0 mole percent to yield tetragonal zirconia.

6. A method as recited in claim 2 wherein:
   the ceramic powder used in said compression molding step and said forming step for forming the second green element is zirconia alloyed with yttria present in the range of from about 0.5 to 5.0 mole percent to yield tetragonal zirconia.

7. A method as recited in claim 2 wherein:
   the ceramic powder used in said compression molding step and said forming step for forming the second green element is zirconia alloyed with calcia present in the range of from about 0.5 to 5.0 mole percent to yield tetragonal zirconia.

8. A method as recited in claim 2 wherein:
   said forming step for forming the second element is performed by tape casting.

9. A method as recited in claim 2 wherein:
   said forming step for forming the second element is performed by compression molding.

10. A method as recited in claim 2 wherein:
    said forming step for forming the second element is performed by gel casting.

11. A method as recited in claim 2 wherein:
    said forming step for forming the second element is performed by injection molding.

12. A method as recited in claim 2 wherein:
    said forming step for forming the second element is performed by dry pressing.

13. A method as recited in claim 2 wherein:
    said forming step for forming the second element is performed by cold isostatic pressing.

14. A method as recited in claim 2 wherein:
    said forming step for forming the second element is performed by extrusion molding.

* * * * *